R. ABELL.
SUPPORTING DEVICE FOR SPEEDOMETER DRIVING MECHANISM.
APPLICATION FILED MAR. 9, 1910.
1,018,542.
Patented Feb. 27, 1912.
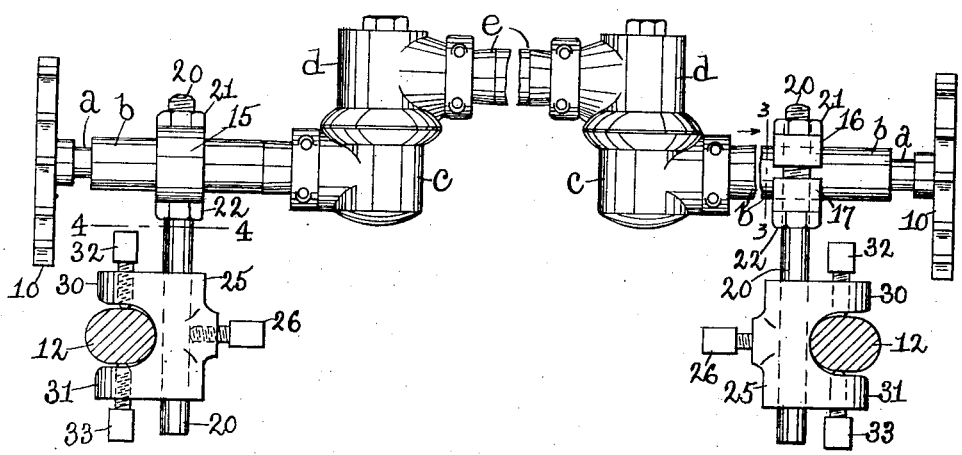
Fig. 1.
Fig. 2.
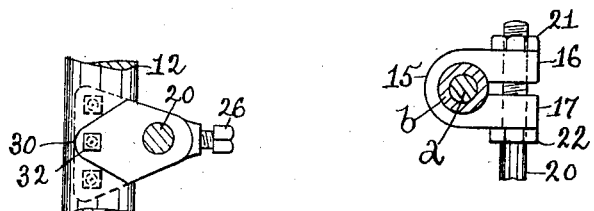
Fig. 4.
Fig. 3.
Witnesses.
Inventor.
Rollin Abell
by Jas. H. Churchill
Atty.

UNITED STATES PATENT OFFICE.

ROLLIN ABELL, OF BOSTON, MASSACHUSETTS.

SUPPORTING DEVICE FOR SPEEDOMETER-DRIVING MECHANISM.

1,018,542.  Specification of Letters Patent.  Patented Feb. 27, 1912.

Application filed March 9, 1910. Serial No. 548,226.

*To all whom it may concern:*

Be it known that I, ROLLIN ABELL, a citizen of the United States, residing in Boston, county of Suffolk, and State of Massachusetts, have invented an Improvement in Supporting Devices for Speedometer-Driving Mechanism, of which the following description, in connection with the accompanying drawings, is a specification, like letters on the drawings representing like parts.

This invention relates to a supporting device for the driving mechanism of a speedometer or like instrument used on automobiles.

The invention has for its object to provide a simple, inexpensive and efficient supporting device, which is capable of being quickly and easily attached to the movable knuckle of the front wheel of the vehicle and which supports the driving mechanism so that the latter is capable of adjustment in different directions with relation to the front wheel of the vehicle. These and other features of this invention will be pointed out in the claims at the end of this specification.

Figure 1 represents in elevation a portion of a speedometer driving mechanism supported by a device embodying this invention. Fig. 2 is a like elevation looking in the opposite direction. Fig. 3, is a detail in section on the line 3—3, Fig. 2, and Fig. 4, a detail in section on the line 4—4, Fig. 1, looking down.

Referring to the drawing, $a$ represents the driving shaft of a speedometer driving mechanism, and $b$ a bearing sleeve for said shaft, which is secured to a housing $c$ rotatably connected with a like housing $d$ having secured to it a bearing sleeve $e$ for the driven shaft (not shown) of the driving mechanism, said shafts being operatively connected together by suitable gears (not shown) but which are located in said housings.

The driving shaft $a$ is provided with the gear 10, which is engaged with a larger gear (not shown), but which is attached to the front wheel of the automobile, in a manner well understood.

The present invention has for its object to provide a simple and efficient device for supporting the sleeve $b$ from the movable knuckle of the front wheel of the vehicle, which knuckle is provided with an arm 12, so that the bearing sleeve $b$ and the shaft $a$ supported thereby may be adjusted in different directions with relation to the gear on the front wheel. To this end, I employ a split clamping collar 15 through which the bearing sleeve $b$ is passed and which is provided with lugs or ears 16, 17 having suitable holes, through which the threaded upper end of an upright rod 20 is passed and which is engaged by nuts 21, 22, located above and below the said lugs or ears, by means of which the said lugs or ears may be moved toward each other so as to firmly fasten the clamping collar in fixed relation to the bearing sleeve, when the latter has been adjusted or moved longitudinally to properly position it in one direction with relation to the gear on the front wheel.

By slackening the nut 21, the clamping collar is free to be rotated or turned on the rod 20 so as to move or adjust the sleeve $b$ angularly and thereby move the gear 10 into closer or looser mesh with the gear on the front wheel of the vehicle, and when properly positioned, the nut 21 is turned up to render the clamping collar 15 fixed on the sleeve and thereby maintain the gear 10 in its adjusted position.

The upright rod 20 is supported in a block or piece 25, which is secured to the arm 12 of the knuckle of the front wheel, and said rod may be removably secured to said block by a set screw 26. The supporting block or piece 25 is provided as shown with forked arms 30, 31, which straddle the knuckle arm 12 and carry set screws 32, 33 having hardened points and by means of which the block 25 may be secured to the arm 12 in fixed relation thereto, the arm 31 being provided with a plurality of screws 33, and the arm 30 with a single screw 32, which engages the arm 12 between the screws 33, as shown in Fig. 4. The block 25 is capable of adjustment on the arm 12 so as to obtain a vertical adjustment of the gear 10 if desired.

From the above description and by reference to the drawings, it will be seen, that the gear 10 of the speedometer driving mechanism, may be accurately fitted or adjusted with relation to the gear on the front wheel of the automobile in a minimum time.

It will be observed that the supporting device for the driving mechanism is simple and inexpensive, and can be quickly and easily applied to the vehicle, and further the adjustments can be quickly and easily made.

Claims.

1. A supporting device of the character described, comprising a split clamping collar having lugs or ears, a rod having a threaded end extended through said lugs or ears, nuts on said rod for moving said lugs or ears toward each other, a supporting block provided with arms and having a hole or opening into which said rod is extended and with arms extended laterally with relation to said hole and separated from each other for the reception of a support for the device, a set screw to engage said rod and render it fixed to said block, and screws carried by said arms to secure said block in a stationary position, substantially as described.

2. A supporting device of the character described, comprising a split clamping collar having lugs or ears, a rod having a threaded end extended loosely through said lugs or ears, nuts on said rod for moving said lugs or ears toward each other, a supporting block for said rod having forked arms, extended laterally with relation to said rod, and means carried by said arms for securing said block in a fixed position, substantially as described.

3. The combination with the bearing sleeve $b$ of a speedometer driving mechanism, of a clamping collar on said sleeve having lugs or ears provided with openings, a rod supporting said clamping collar and extended loosely through the openings in the said lugs or ears, means on said rod to clamp said collar in fixed relation to said sleeve, and a support for said rod capable of being attached to the arm of the movable knuckle of the front wheel of an automobile, substantially as described.

4. A supporting device for the driving mechanism of a speedometer, comprising a split collar having lugs or ears, a threaded rod loosely extended through said lugs or ears, nuts on said rod above and below said lugs or ears, a block to which said rod is attached and provided with forked arms extended laterally with relation to said rod, and screws carried by said forked arms and movable in a direction substantially parallel with said rod, the screw on one of said arms being located in a plane between a plurality of screws on the other of said arms, substantially as described.

In testimony whereof, I have signed my name to this specification in the presence of two subscribing witnesses.

ROLLIN ABELL.

Witnesses:
JAS. H. CHURCHILL,
J. MURPHY.

---

Copies of this patent may be obtained for five cents each, by addressing the "Commissioner of Patents, Washington, D. C."